(12) United States Patent
Kent et al.

(10) Patent No.: US 7,087,830 B2
(45) Date of Patent: Aug. 8, 2006

(54) SYSTEM FOR CONVERTING TURNTABLE MOTION TO MIDI DATA

(75) Inventors: Justin A. Kent, 279 Pearl St. #2L, Cambridge, MA (US) 02139; Kevin D. Mccormick, Boston, MA (US)

(73) Assignee: Justin A. Kent, Deltona, FL (US)

( * ) Notice: Subject to any disclaimer, the term of this patent is extended or adjusted under 35 U.S.C. 154(b) by 478 days.

(21) Appl. No.: 10/213,862

(22) Filed: Aug. 7, 2002

(65) Prior Publication Data

US 2003/0029305 A1   Feb. 13, 2003

Related U.S. Application Data

(60) Provisional application No. 60/310,547, filed on Aug. 7, 2001.

(51) Int. Cl.
*G10H 7/00*   (2006.01)

(52) U.S. Cl. ........................................ 84/645

(58) Field of Classification Search .................. 84/645
See application file for complete search history.

(56) References Cited

U.S. PATENT DOCUMENTS

| | | | |
|---|---|---|---|
| 4,300,225 A | 11/1981 | Lambl | |
| 4,942,551 A | 7/1990 | Klappert et al. | |
| 5,054,359 A | 10/1991 | Hikawa | |
| 5,159,143 A * | 10/1992 | Emi et al. ...................... | 84/645 |
| 5,194,682 A | 3/1993 | Okamura et al. | |
| 5,350,882 A | 9/1994 | Koguchi et al. | |
| 5,512,704 A * | 4/1996 | Adachi ........................ | 84/605 |
| 5,675,557 A * | 10/1997 | Hubinger ........................ | 369/4 |
| 5,683,253 A | 11/1997 | Park et al. | |
| 5,805,545 A | 9/1998 | Nakamaru et al. | |
| 5,953,485 A | 9/1999 | Abecassis | |
| 6,025,552 A | 2/2000 | Mukaino et al. | |
| 6,078,005 A | 6/2000 | Kurakake et al. | |
| 6,153,822 A | 11/2000 | Toba et al. | |
| 6,175,074 B1 | 1/2001 | Takahashi et al. | |
| 6,379,244 B1 * | 4/2002 | Sagawa et al. ................. | 463/7 |
| 6,541,690 B1 * | 4/2003 | Segers, Jr. .................... | 84/605 |
| 6,545,815 B1 * | 4/2003 | Kroupenkine et al. ...... | 359/665 |
| 6,545,953 B1 * | 4/2003 | Herbert ......................... | 369/4 |
| 6,576,825 B1 * | 6/2003 | Yamada et al. ................ | 84/602 |
| 6,618,329 B1 * | 9/2003 | Liu ................................ | 369/4 |
| 6,745,091 B1 * | 6/2004 | Liu ................................ | 700/94 |
| 6,818,815 B1 * | 11/2004 | Cohen ........................... | 84/645 |
| 2004/0089795 A1 * | 5/2004 | Spencer .................... | 250/231.1 |

FOREIGN PATENT DOCUMENTS

| | | |
|---|---|---|
| EP | 1020849 | 7/2000 |
| WO | WO 9701168 | 1/1997 |

* cited by examiner

*Primary Examiner*—Jeffrey W Donels
(74) *Attorney, Agent, or Firm*—James H. Beusse; Beusse Wolter Sanks Mora & Maire, P.A.

(57) ABSTRACT

A computerized method and apparatus for creating a scratch effect through a MIDI interface. In one form, timing signals are derived from a turntable whose direction and speed of rotation are manually controlled by a disk jockey. The timing signals are processed by a microcomputer into a MIDI protocol recognizable by a conventional MIDI instrument. Preferably, the microcomputer is coupled to control a computer which interprets the MIDI protocol output and uses the output to regulate speed and direction of playback of a musical and/or visual presentation.

14 Claims, 5 Drawing Sheets

SYSTEM FOR CONVERTING TURNTABLE MOTION TO MIDI DATA

SPECIFIC DATA RELATED TO THE INVENTION

This application claims benefit of U.S. provisional application Ser. No. 60/310,547, filed Aug. 7, 2001.

BACKGROUND OF THE INVENTION

The present invention relates to audio and visual presentations and, more particularly, to a method and apparatus for modifying and creating such presentations using "scratch" techniques and a MIDI interface.

For several years, disc jockeys (DJ's) have been creating an unusual form of musical presentation by placing their fingers on a record to control both the speed and direction of rotation of the record. Commonly, the DJ's rotate the record backward and forward in a quick repetitive motion to create the effect of a phrase being played forward and backward at a fast rate. This repetitive playing of short phrases in a musical presentation has come to be known as "scratching" and produces a distinctive tonal sound. Some musicians have adopted this mode of musical creation to introduce scratch phrases into original works. Scratching may also be accompanied by simultaneous changes in volume.

One issue with the common approach to creating this unusual musical effect is that the presentation is created by rapid motion of a playback needle in a groove of a vinyl record and the action of manually moving the record forward and backward rapidly to create the effect causes severe wear on both the record and the needle. Consequently, the life of both record and needle is significantly reduced. While cost attributable to having to replace the records and needles is one issue, the more significant issue is that vinyl records are being quickly replaced by audiotapes, compact disks and computer-stored songs. Further, today's major musical presentations are accompanied by video presentations of the artists playing the music and synchronization of the video with the DJ's scratching requires control of both the audio and video presentations.

In 1997 the European patent office published Patent Number WO9701168 (the '168 patent) for a Digital Processing Device for Audio Signal. That patent describes a system for the digital processing of audio signals, particularly for disc jockeys and scratch musicians. The speed and direction of reproduction of an audio signal coming from an external source, e.g., from a CD player, can be controlled by acting manually on a rotating element. The speed of rotation of this element is normally constant but can be modified by the disc jockey. The audio signal is sampled and stored at a constant frequency in a sampling buffer and read at a variable frequency as a function of the speed and direction of the rotating element. In one embodiment, the element is a record player turntable and the disc jockey can act upon the speed of rotation by using a hand to control the platter of the turntable. An optical sensor senses the speed and direction of rotation of the turntable and provides signals to control the speed and direction of reproduction of the sampled audio signal.

As best understood, the device of the '168 patent requires a system in which music obtained from an external source is stored in sequential data blocks in an addressable memory. The rotating element is a disk having a plurality of alternating white and black marks for generating a sequence of pulses as the disk is rotated beneath the optical sensor. Each pulse from the sensors causes the memory to step to a next one of the sequential data blocks, either forward or backward depending on the direction of rotation of the disk. In that manner, the DJ can control the speed and direction of playing of the music to create a scratch effect. The disadvantage of this device is that it requires a means of sequentially storing samples of music into a memory that can be addressed to cause the music samples to be played in sequential data blocks.

In about 1983, the music industry began developing a new form of communication protocol to allow electronic creation and control of music synthesis. The standard for this protocol was named Musical Instrument Digital Interface and became widely known as MIDI. Electronic instruments using this protocol became known as electronic synthesizers and can be found in the form of pianos, drums, organs and many other instruments. Using MIDI, multiple instruments can be coupled together to create a wide range of musical compositions.

One of the advantages of MIDI is that data is transmitted to an instrument in the form of a digital byte having a number of commands that tell the instrument when to start a note, when to stop the note, what frequency to play, what volume to play and what effects to give the note. Additionally, the data includes a time scale that allows the instrument to play at different tempos or beats per minute. For example, a composition that plays for four minutes at 80 beats per minute would only play for two minutes at 160 beats per minute. The MIDI protocol is constructed so that an external source can send timing data to a musical instrument to control tempo even for pre-recorded music being played by the instrument.

As computers have proliferated in the musical industry, various interfaces have been developed to allow computers to communicate with electronic musical instruments (synthesizers) and broaden the range of sound that can be generated. For example, the MIDI protocol requires that each byte of data specify a channel and the instrument will only respond to data related to that one channel. A computer can essentially simultaneously send out commands on multiple channels thereby controlling more instruments and more sounds at one time. Various software packages have been developed for creating music using this advantage of computers. Further, the music aspect of MIDI has been expanded to include audio-visual presentations so that images can be synchronized with audio in any presentation and at any tempo. What is now needed is an interface that allows a musician or a disk jockey to use the power of the MIDI protocol to create a new form of audio-visual presentation incorporating manual control of the presentation and manual musical interpretation using scratching.

SUMMARY OF THE INVENTION

In a preferred form the present invention provides a MIDI interface to an audio-visual player or just to an audio player that allows manual control of an audio-visual or audio work in a manner that implements scratching as that term is currently used by disc jockeys. In the disclosed form, the invention uses a conventional turntable for vinyl records outfitted with an optical sensor. A disk having multiple encircling bands of alternating black and white stripes is designed to fit on a platter of the conventional turntable. Each band has a different radius from a center of the platter. The arcuate width of each of the stripes in each band may be the same or different. In one form, the disk has a plurality of bands on one side all having the same width stripes and has a plurality of bands on an opposite side having different width stripes. The different widths may be selected to provide different timing signals on one side of the disk than are available on the other side where the widths are equal. The optical sensor detects the pattern of stripes in any one band passing under the sensor and outputs a pulse or timing signal corresponding to the rate at which the stripes of a band pass under the sensor. A light source may be positioned to direct a light of predetermined brightness onto the stripes to enable reading of the stripes by the optical sensor.

An electronic converter is coupled to the optical sensor and converts the pulses from the sensor into timing and direction signals in a MIDI format. These MIDI formatted signals may then be coupled to any device that can accept MIDI signals and will control the operation of the device. In one form, the signals can be coupled to a computer that is playing an audio-visual work and the signals will cause the computer to play the work at the speed and in the direction, i.e., forward or backward, specified by the MIDI signals.

In another form, the turntable may be fitted with a mechanical sensor such as a drive wheel that detects the direction and speed of rotation of the turntable and converts that motion and direction to a string of pulses similar to those generated by the optical sensor.

BRIEF DESCRIPTION OF THE DRAWINGS

The features and advantages of the present invention will become apparent from the following detailed description of the invention when read with the accompanying drawings in which:

FIG. 4 is a timing diagram for timing signals for determining rotation direction of the disk of FIG. 2a;

FIG. 5, comprising

DETAILED DESCRIPTION OF THE INVENTION

Figure 1:
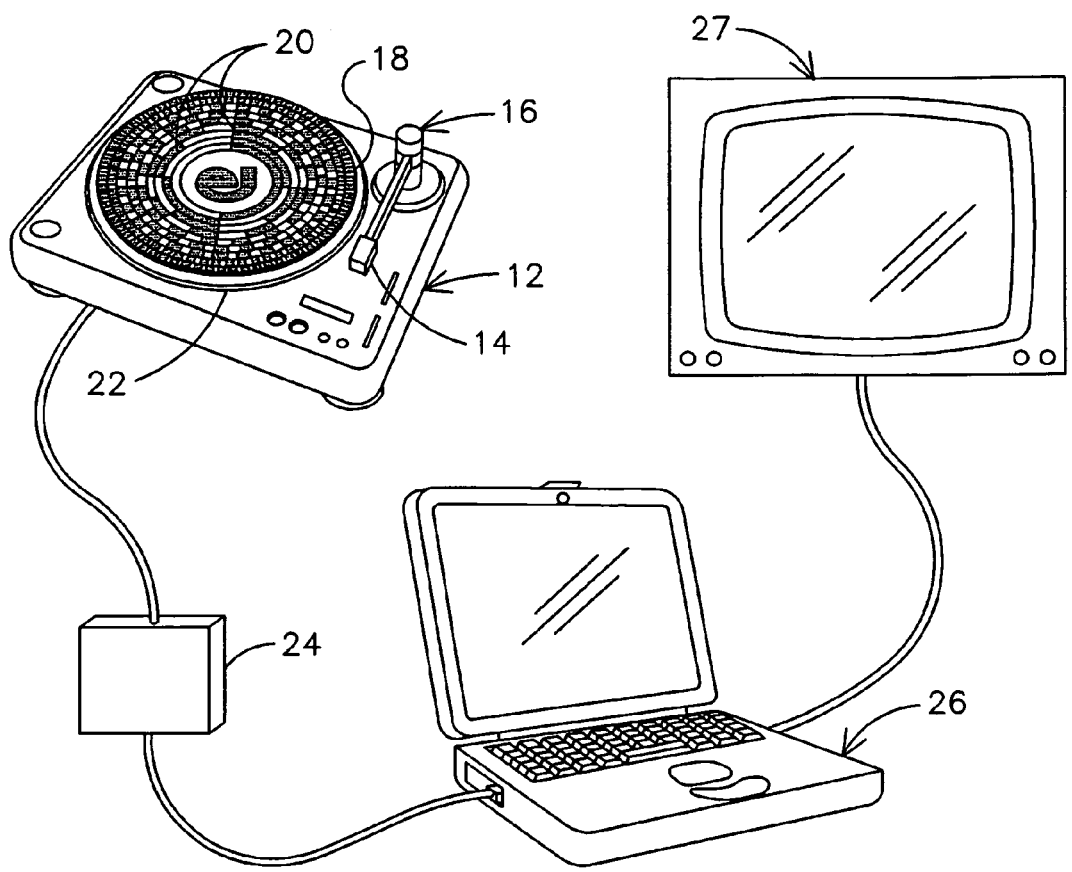
FIG. 1 is a functional block diagram of a system for implementing one form of the present invention.

FIG. 1 is a functional hardware diagram of one form of the present invention. A conventional turntable 12 is modified to receive an optical sensor 14 in place of a standard needle at the end of the pick-up or tone arm 16. A disk 18 having a plurality of arcuate or circular bands 20 is placed on the platter 22 of the turntable. Assuming that the platter 22 is turning at constant rotational speed, the number of pulses per minute produced by the optical sensor 14 will depend on the number of alternating black and white stripes in a band over which the sensor 14 is placed. For example, in the illustrated embodiment, there are 54 alternating black and white stripes in the outermost band but only 2 stripes in the innermost band. Accordingly, if the optical sensor 14 is placed on the outermost band, one revolution of the platter 22 will produce 54 pulse changes. However, if the sensor 14 is over the innermost band, one revolution of the platter will produce only two pulse changes. A light 23, shown in FIG. 6, preferably in the form of an LED, is also mounted in the tone arm 16 near the optical sensor 14 to provide illumination of the stripes as they pass by the sensor.

The pulses from the optical sensor 14 are coupled to a MIDI converter 24 which is preferably incorporated into the turntable 12. The MIDI converter 24 comprises amplifiers and filters for the electrical signals from the optical sensor 14 as well as a programmed PIC 16F873 chip that formats the signals into the MIDI protocol. The format of a signal to meet the MIDI protocol is well know in the art. The MIDI formatted signal is then coupled to a MIDI port on an audiovisual device, shown here as a laptop computer 26. Computers such as computer 26 are commercially available and have MIDI standard ports that accept a standard DIN-type male plug with five pins. Typically, a MIDI device will have an input port, an output port and a through port, although the through port may not be present on the computer. In this instance, the output port of computer 26 is coupled to an audio-visual display device 27 such as a television with associated speakers.

In use, the operator of the turntable 12 will place the optical sensor in juxtaposition to one of the bands of the disk 18 which will cause the audio and visual work controlled by the computer 26 to play at a normal speed or tempo. The overall speed of the work can be changed by moving the sensor 14 to another band which will result in a different number of timing signals per unit time being sent to the computer 26 via the MIDI converter 24. If the operator then wants to produce a scratch effect, he/she can place a finger on the disk 18 and manually cause it to move faster or slower or to repeat a phrase of the work at whatever speed is desired. While the signals from the converter 24 are preferably used as timing signals to control playback speed and direction, it will be recognized that the converter could convert the signals to other forms of MIDI input such as note start and note stop signals to achieve a similar result.

Figure 2A:
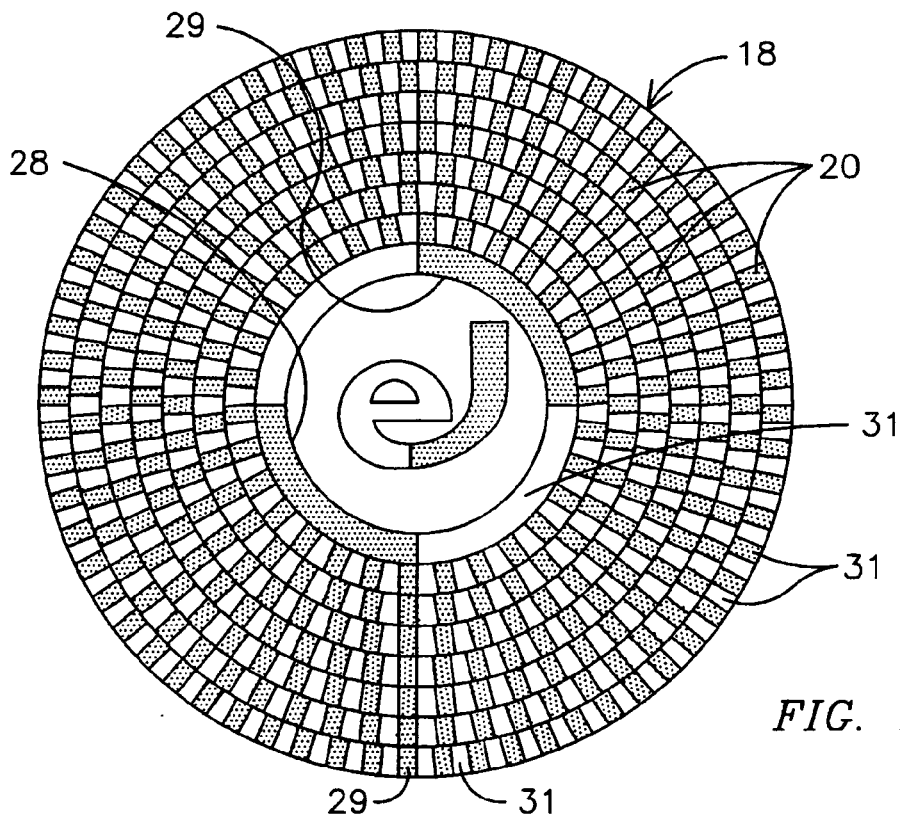
FIGS. 2a and 2b are exemplary embodiments of a disk for developing timing signals in one form of the invention.
Figure 2B:
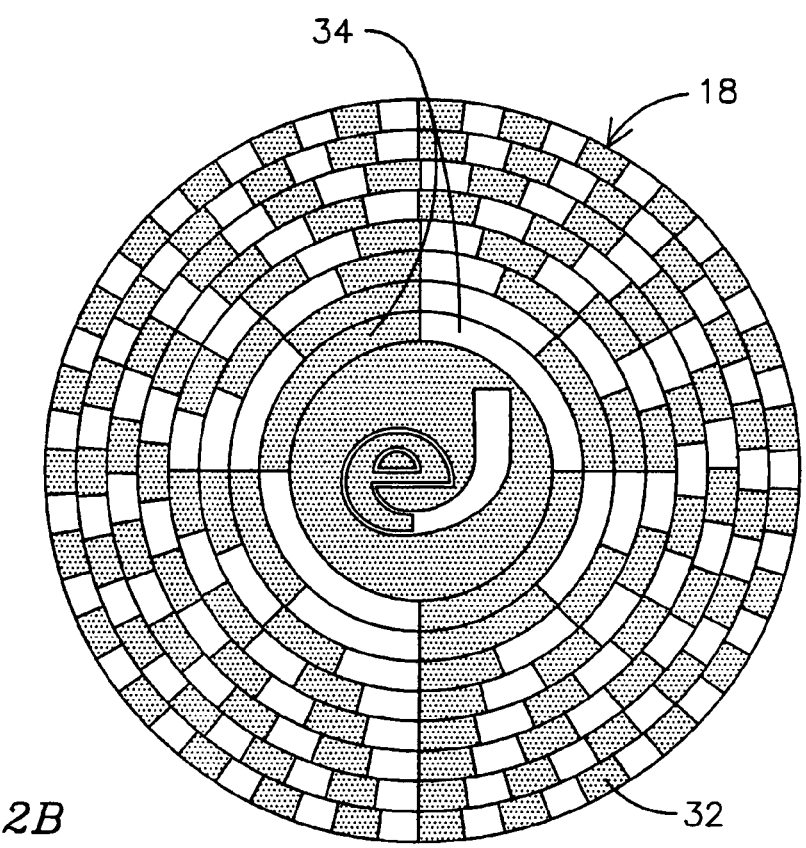

Turning now to FIGS. 2a and 2b, there are shown an exemplary forms of the front side and rear side of the disk 18. FIG. 2a illustrates a form of disk banding and striping such that the size of each of the black and white stripes 29, 31 is the same for each band of stripes. The only change in going from an inner band 28 to an outer band 30 is in the number of stripes that are in the respective bands. As will be appreciated, the number of beats per minute that can be generated by one rotation of the disk at constant speed is several times greater in the outer band 30 than in the inner band 28. The need for the different bands arises from the limited range of speed change that is generally available on a conventional turntable. Professional turntables usually have a slide control that allows the operator to vary the speed of the platter by about 8%. However, the inner band to outer band ratio of spaces provides for a 2:1 beat variation in the disclosed embodiment of FIG. 2a. The embodiment of FIG. 2b provides a different range change of timing pulses with outer band 32 having 27 black stripes and 27 white stripes. The inner band 34 of FIG. 2b only has two white stripes and two black stripes producing only four pulse signals per revolution of the disk 18. In comparison, outer band 30 of the disk pattern of FIG. 2a has 64 each of white and black stripes.

Figure 4:
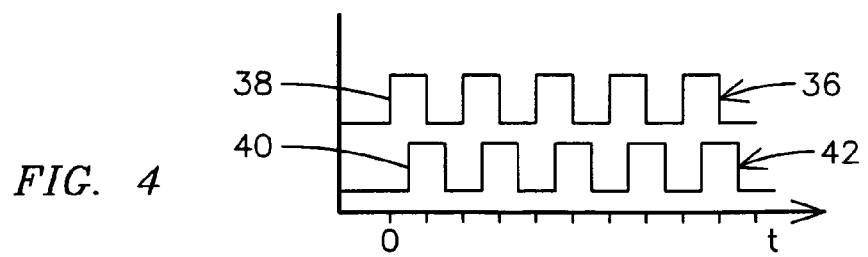
Figure 6:
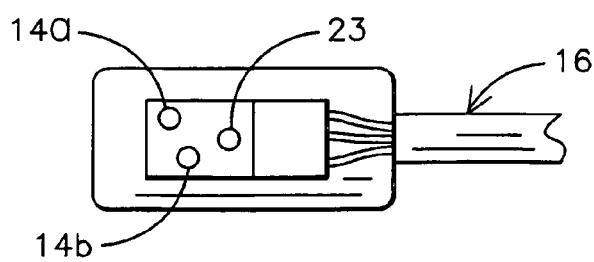
FIG. 6 is a bottom plan view of an optical detector in one form of the invention.
Figure 3:
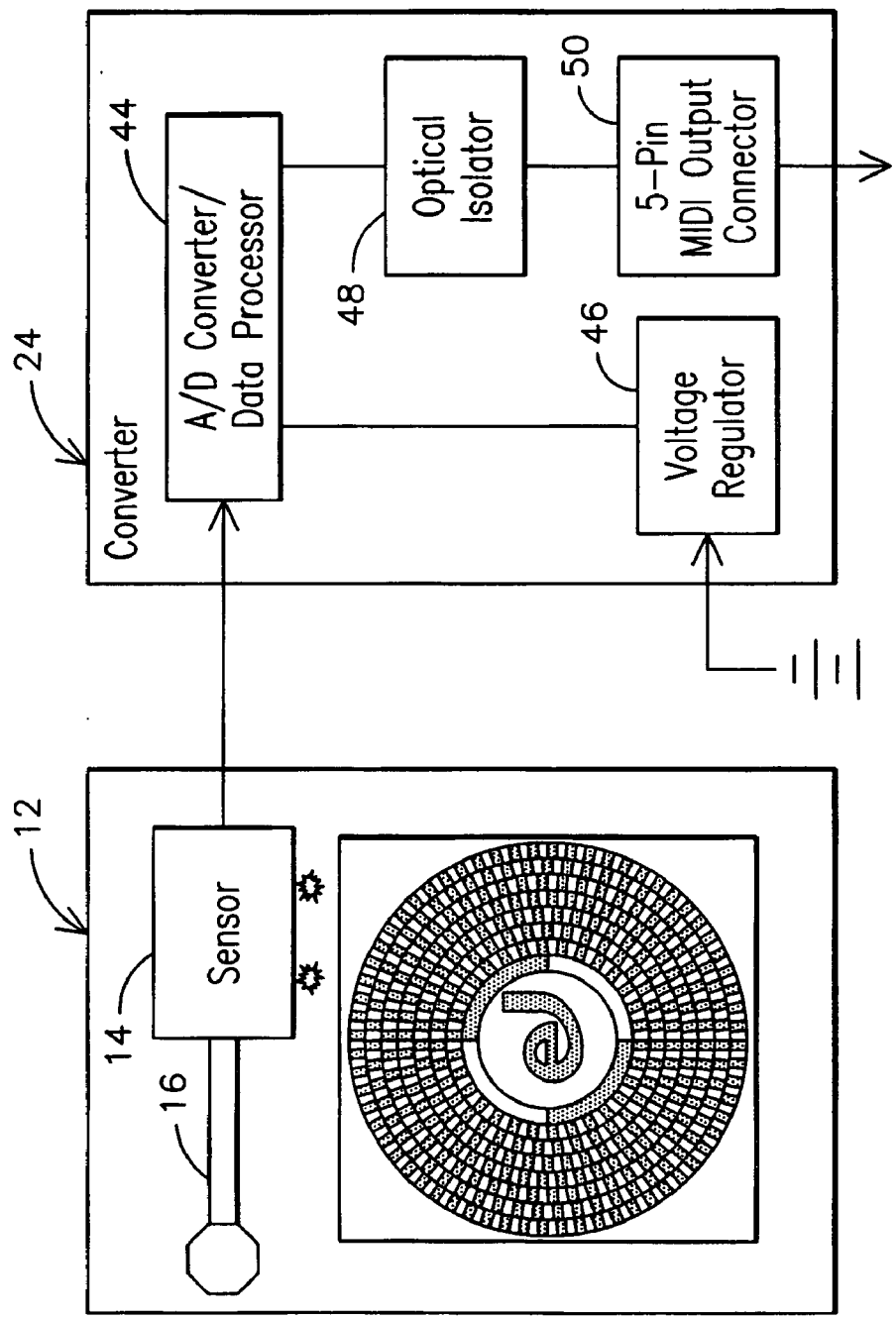
FIG. 3 is a functional block diagram of one form of MIDI converter.

FIG. 3 is a simplified functional block diagram of the MIDI converter 24 and turntable 12. The pulse signals from the optical sensor 14 are shown in FIG. 4. The sensor 14 comprises a pair of optical detectors 14a, 14b of a type well known in the art, each of which provides a sequence of pulse signals responsive to the change in light reflected from the alternating black and white stripes. As shown in FIG. 6, which is a bottom plan view of the end of tone arm 16, the optical detectors 14a and 14b are slightly offset so that the system can detect the direction of rotation. For example, assuming normal rotation of the disk 18, the leading detector will produce the pulse train labeled 36 having a leading edge 38 occurring at a time prior to a leading edge 40 of a pulse train 42 from the lagging detector. Based upon which pulse occurs first, the converter 24 is able to determine the direction in which the disk 18 is being rotated. The pulse data from the optical detectors is typically coupled to operational amplifiers (See FIG. 5) that are connected in the form of a conventional comparator circuit for squaring the leading and/or trailing edges of the pulse signals. Within the converter 24 is an A/D converter and data processor 44 which is programmed to convert the pulse data from the sensor 14 to a data stream in a MIDI format or protocol. The converter also includes a voltage regulator 46 to set the voltage for the electronics and an optical isolator 48 to couple the MIDI formatted data stream to the 5-pin MIDI output connector 50.

In one form, the microcomputer 44 calculates the rate of rotation of the disk 18 from the pulse signal rate and converts this rate to a signal corresponding to a conventional signal of the type used with MIDI instruments to set tempo. Alternately, the pulse rate could be used as position data to step through discrete frames or sequences of frames of data. In one MIDI implementation, each band corresponds to a quantized position of a MIDI 'continuous controller.' A continuous controller may have any value between 0 and 127. Therefore, as the record rotates in a normal clockwise fashion, the value of the continuous controller is regularly incremented. If the rotation of the record is stopped, no new controller updates are sent. If the record is rotated in reverse, the controller value is decremented. If the controller value is incremented to 127 and beyond, the value should loop back around to zero and continue incrementing, as well as the opposite in the case of decrementing past 0. With this convention, appropriate MIDI software can determine the position and rate of the rotating vinyl.

As the optical sensors each send a pulse train corresponding to the light and dark bands on the record, the firmware interprets the vertical edges of one and the high/low state of the other to determine a direction of rotation. With each passing of a band, this rotation either increments (forward/clockwise rotation) or decrements (backward/counterclockwise rotation) a MIDI continuous controller value. Therefore, whenever a band passes by the light sensors, 3 bytes are transmitted through the MIDI out: a channel number byte, a controller number byte, and the byte of the actual value being transmitted. An additional continuous controller can also be utilized as a fine control to send more accurate timing information, or the combination of two continuous controllers can also be used to send very accurate rate information, rather than position data. The continuous controller number and the channel it's value is transmitted on can both be changed by the user via MIDI SysEx messages sent to the MIDI In port. Other MIDI messages such as Note On/Off or Continuous Controller messages sent to the MIDI In port should be merged with the output of the turntable, to allow for daisy chaining of multiple devices.

Figure 5A:
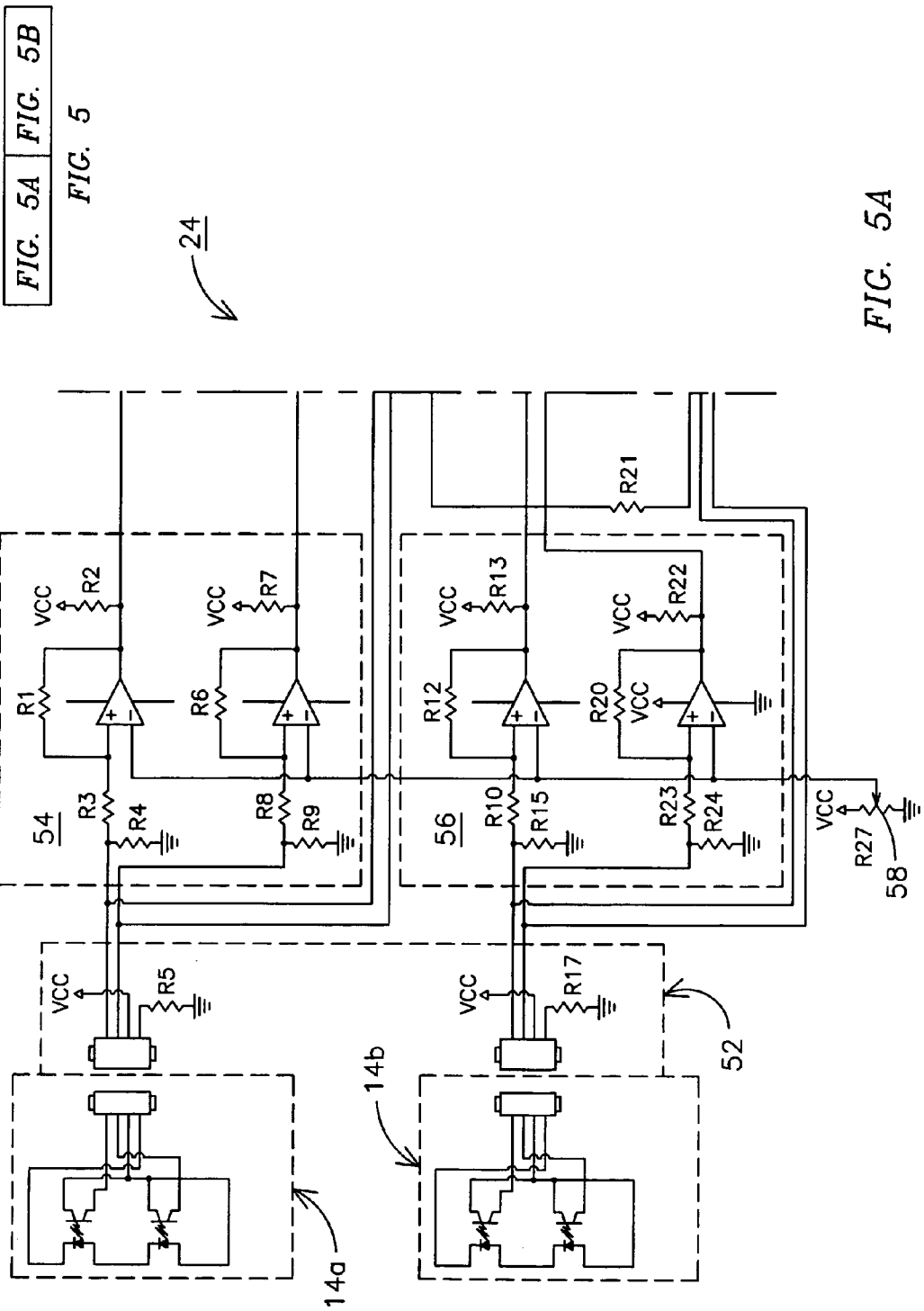
FIG. 5A and FIG. 5b, is a schematic representation of the converter of FIG. 3.
Figure 5B:
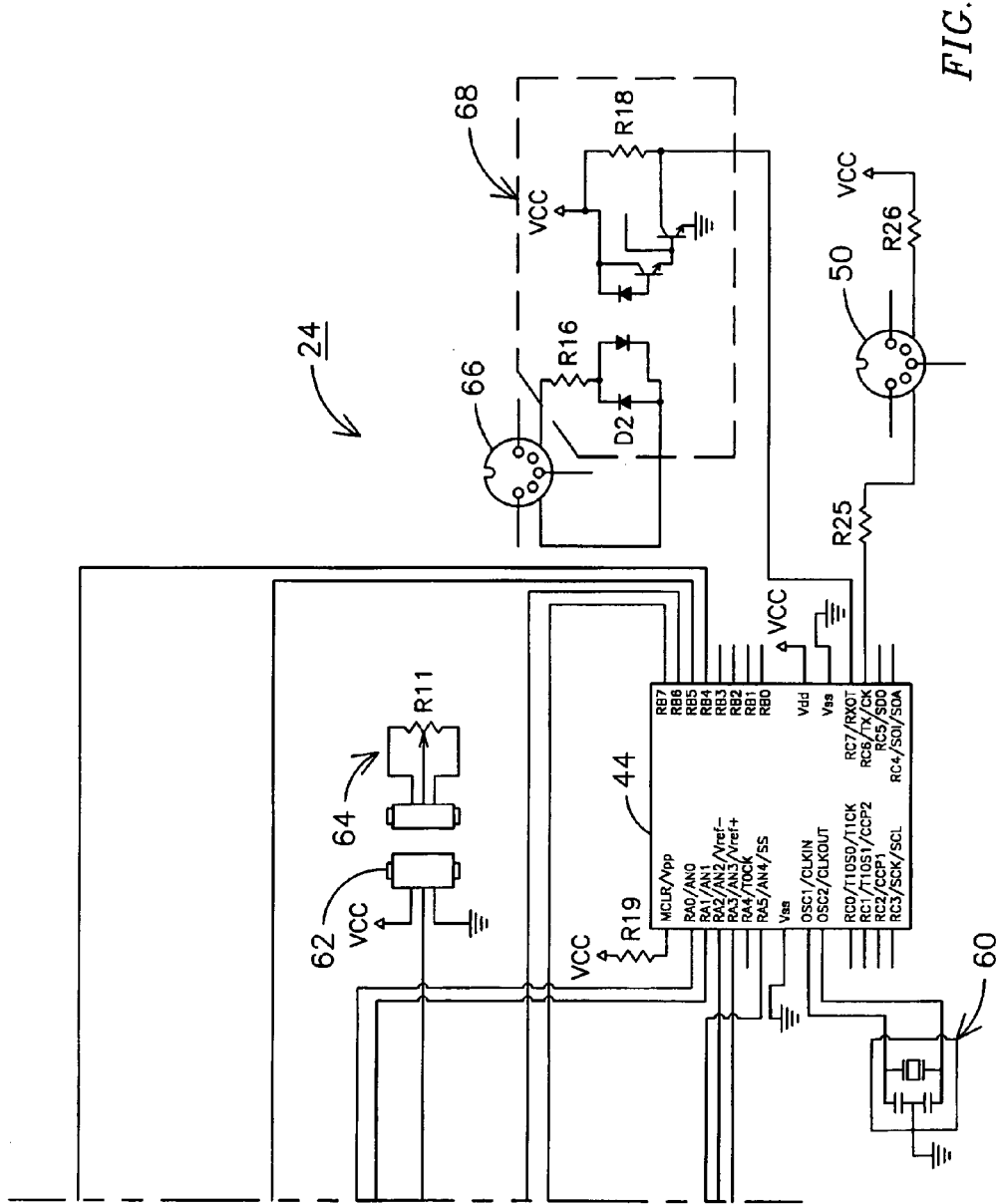

Referring to FIG. 5, there is shown one embodiment of a MIDI converter 24. The optical detectors 14*a*, 14*b* are preferably constructed into a module that plugs into a conventional connector 52 on a turntable tone arm such as arm 16 of FIG. 1. Electrical power is supplied to the detectors 14 from the turntable. Output signals from the detectors 14*a*, 14*b* are coupled to comparators 54, 56 respectively. A bias control 58 sets the comparison level for each comparator 54, 56 concurrently. The comparators 54, 56 shape the optical output signals and minimize noise signals being coupled to the data processor.

The comparators 54, 56 couple the pulse signals from the optical detectors 14 to I/O ports B of the PIC16 microchip 44. The pulse signals are also coupled directly to other I/O ports A of microchip 44. A separate oscillator 60 provides clock signals to microchip 44. There is also provided a connector 62 for coupling to an external fader control 64 to adjust volume of the audio programming. The PIC 16 is a widely used programmable microchip and numerous publications describe various programming techniques for these devices. In the present invention, microchip 44 is programmed to convert the pulse signals from optical detectors 14 into MIDI formatted signals that can be applied to control any MIDI enabled device, including various music synthesizers and computers adapted for responding to MIDI type signals. In FIG. 5, the microchip 44 is connected for supplying the MIDI formatted output signals as a data stream for a performance device via the conventional MIDI port 50. Note also that the microchip 44 can receive MIDI formatted signals via MIDI input port 66 and optical isolator 68. The microchip 44 can be used to modify the MIDI input signals in response to the pulse signals and output the modified signals via port 50.

An important feature of the invention is that it interfaces through a MIDI protocol so that it is general enough to allow for scratching of a variety of unintended mediums and the user can interface the turntable to any existing or future MIDI devices.

While the invention has been described in what is presently considered to be a preferred embodiment, various modifications and variations will become apparent to those skilled in the art. It is intended therefore that the invention not be limited to the specific disclosed embodiment but be interpreted within the full spirit and scope of the appended claims.

What is claimed is:

1. Apparatus for manually controlling at least one segment of a computer generated audio and visual presentation comprising:
    a turntable having a pick-up arm and a rotatable platter, the pick-up arm being positionable at selected positions over the platter;
    an optical sensor mounted at an end of the pick-up arm and having a pair of optical detectors positioned for alignment on spaced radii of the platter;
    a pattern disk positionable on the platter and having a plurality of arcuate bands of alternating black and white stripes within each band wherein the optical detectors provide a sequence of electrical pulses corresponding to transitions between the black and white stripes as the disk is rotated adjacent the optical detectors, the electrical pulses being representative of the speed and direction of rotation of the disk;
    a MIDI converter coupled for receiving the electrical pulses and for converting the pulses to a MIDI formatted control signal; and
    an audio and visual performance device coupled for receiving the MIDI formatted control signals from the MIDI converter and being responsive thereto for controlling the speed and play direction of an audio and visual work produced by the device.

2. Apparatus for implementing a musical scratch effect comprising:
    a turntable;

motion sensing apparatus operatively associated with the turntable for providing signals indicative of the direction and speed of rotation of the turntable, the motion sensing apparatus including a disk having at least one circular band defined by a plurality of arcuately spaced optical stripes; and electronic signal processing means coupled for receiving the signals and for converting the signals to a data stream in a MIDI protocol.

3. The apparatus of claim 2 wherein the motion sensing apparatus includes an optical sensor for detecting the speed and direction of rotation of the disk by sensing the passage of stripes thereby.

4. The apparatus of claim 3 and further including apparatus responsive to the MIDI formatted data stream for reproducing sounds at a rate and direction corresponding to movement of the turntable.

5. The apparatus of claim 4 wherein the optical sensors are mounted in a tone arm of the turntable and comprise a pair of offset optical detectors.

6. The apparatus of claim 5 and including a light mounted in the tone arm and positioned to illuminate the stripes passing by the optical detectors.

7. The apparatus of claim 5 wherein the light comprises an LED.

8. The apparatus of claim 6 wherein each of the optical detectors provides an independent sequence of pulse signals with offset leading and trailing edges.

9. The apparatus of claim 7 wherein the signal processing means comprises a digital data processor connected for receiving each of the sequence of pulse signals and for comparing a time of arrival of the leading edges of corresponding pulses in each sequence for determining the direction of rotation of the turntable.

10. Apparatus for implementing a musical scratch effect comprising a disk having a plurality of circular bands imprinted on at least one face thereof, each of the bands being defined by a plurality of uniformly spaced stripes, the disk being adapted for positioning on a platter of a turntable to enable detection of the speed and direction of rotation of the turntable by monitoring passage of the stripes passed a detector; and including a data processor for converting signals representative of the passage of stripes by the detector to a MIDI formatted data stream.

11. The apparatus of claim 10 wherein the disk is imprinted on an opposite face thereof with a plurality of bands of stripes, the number of stripes per band on the opposite face being different from the number of stripes per band on the at least one face thereof.

12. The apparatus of claim 10 wherein each band has a different number of stripes.

13. The apparatus of claim 12 wherein an outermost band has 54 stripes and the innermost band has two stripes.

14. The apparatus of claim 12 wherein the number of bands per side of the disk is eight.

* * * * *